April 10, 1956  L. W. LESSLER  2,741,152
CLAW AND SHUTTER ARRANGEMENT FOR A CAMERA
Filed Jan. 17, 1952

INVENTOR.
LEW W. LESSLER
BY
James and Franklin
ATTORNEYS

United States Patent Office 2,741,152
Patented Apr. 10, 1956

2,741,152

CLAW AND SHUTTER ARRANGEMENT FOR A CAMERA

Lew W. Lessler, Binghamton, N. Y., assignor to De Jur-Amsco Corporation, Long Island City, N. Y., a corporation of New York Application January 17, 1952, Serial No. 266,889

6 Claims. (Cl. 88—18.4)

The present invention relates to a novel arrangement, in a motion picture camera or the like, of a shutter and a claw mechanism for feeding film.

In a motion picture camera film is normally moved past an aperture in an intermittent fashion, the aperture being opened and closed by a shutter moved in synchronized relation to the motion of the film so as to expose individual frames of the film while the film is stationary and to close the aperture while the film is being moved and until the next film frame is positioned opposite the aperture. The film is usually provided with sprocket holes along an edge thereof, and those holes are adapted to be engaged by claws which move in the direction of desired motion of the film so as to pull the film along therewith, the claws then disengaging themselves from the film, moving back in the opposite direction while the film is stationary, and then engaging newly presented film sprocket holes preparatory to repeating the cycle. Since the claws must actually engage the film, it follows that they must be positioned close to the film.

It is, of course, desirable that the shutter be positioned as close as possible to the aperture in order to effectively block light passing therethrough. Moreover, for well understood optical reasons, it is often very desirable that the shutter be positioned as close as possible to the focal plane of the optical system of the camera. In the past, these criteria were not readily capable of being achieved because they necessarily involved close spacing between the shutter and the claws. The present invention relates to a simplified arrangement and mounting of the shutter and claws so that the shutter may be positioned very close to the aperture, and exactly or almost at the focal plane of the camera's optical system, without interfering with the action of the claws. Indeed, by reason of the arrangement of parts here disclosed, the claws are driven directly and positively by the shutter itself, the complex motion of the claws being achieved in a simple and straightforward manner.

To these ends, the shutter is mounted very close to one surface of an apertured plate over the other surface of which the film is adapted to pass, the claw frame being positioned on the other side of said shutter from said plate and directly over and encompassing said shutter, the claw frame having members extending therefrom beyond the path of movement of the shutter, at least one of those members serving to mount and support the claw frame with its desired degree of movement, and another of those members carrying the claw itself, that claw being adapted to project through slots in the camera plate so as to engage the sprocket holes in the film to be exposed.

To the accomplishment of the above, and to such other objects as may hereinafter appear, the present invention relates to the arrangement and mounting of a shutter and a claw frame in a motion picture camera as defined in the following claims and as described in this specification taken together with the accompanying drawings in which:

Figure 5:
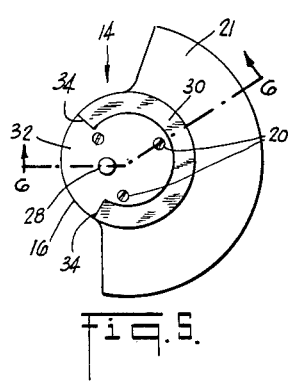
Fig. 5 is a top plan view of the shutter.

Fig, 6 is a cross sectional view taken along the line 6—6 of Fig. 5.

The camera comprises a wall 2 which may extend from one side to the other of the camera, only so much of said wall as is necessary to illustrate the instant invention being shown in the drawings. A wall 4 extends at right angles thereto and downwardly therefrom as viewed in Figs. 1 and 3, the wall 4 being omitted from Fig. 2 for illustrative purposes. The space between the wall 4 and the lower portion of wall 2 as viewed in Fig. 1 (or the right hand portion of wall 2 as viewed in Fig. 4) may be open for reception thereinto of a magazine containing the film to be exposed, and the space between the wall 4 and the upper portion of the wall 2 in Fig. 1 (or the left hand portion of the wall 2 in Fig. 3) may contain other portions of the camera mechanism such as the driving motor, gear trains, speed control mechanism, and the like. It will be understood that this particular camera construction is in no way essential to the instant invention, but is merely here disclosed to illustrate one embodiment thereof.

Turning now to the claw and shutter arrangement which forms the subject matter of the instant invention, the wall 2 is provided with a projecting portion 6 having an exposure aperture 8 therethrough, that aperture being of a size comparable to each frame of the film, and having a pair of parallel slots 10 therethrough beyond and on either side of the aperture 8. The film is adapted to be moved past the outer or lower surface 12 of the projection 6 while the claw and shutter arrangement which forms the subject matter of the instant invention is mounted on the inner or upper surface 13 of the plate 2.

The shutter, generally designated 14, comprises a central portion 16 to which the shutter plate 18 is secured by means of screws 20, that plate having an arcuate radially projecting portion 21 extening around only a part of the circumference of the central portion 16. A shaft 22 extends through the wall 2 above the wall 4 as viewed in Fig. 1 and to the left of the wall 4 as viewed in Fig. 3, that shaft being secured in any appropriate manner to the shutter plate 18, being rotatably mounted in the camera and carrying at its lower extremity a gear 24 adapted to mesh with another gear 26 connected in any appropriate manner to the driving motor of the camera. Hence the driving motor will rotate the shaft 22 and with it the shutter 14. The shaft 22 is so positioned that as the shutter 14 rotates the outwardly extending arcuate portion 21 of the shutter plate 18 will alternately cover and uncover the aperture 8, as may best be seen from an examination of Fig. 1. Since the shutter 14 is mounted to one side of the aperture 8, and since no structure is interposed between the under-surafce of the shutter plate 18 and the surface 13 of the wall 2, it is clear that the shutter plate 18 may be mounted very close to, and almost touching, the plate 2, and hence very close to the focal plane of the optical system of the camera or to any other desired portion of that optical system as determined by the particular camera design. The spacing between the wall 2 and the camera plate 18 as shown in Fig. 2 is for illustrative purposes only, and careful design can succeed in reducing that clearance to an almost vanishing small amount, the clearance being limited only by the vibration to which the parts may be subjected when the camera is in use.

The central portion 16 of the shutter 14 is provided with an eccentrically mounted pin 28 and with a circular cam track defined by lower portion 30 and raised portion 32 connected by inclined paths 34.

Figure 1:
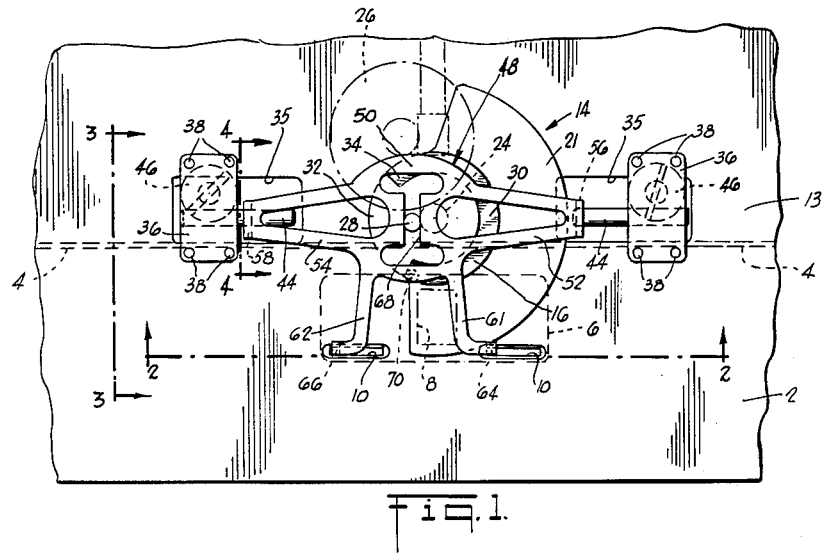
Fig. 1 is a plan view of the shutter and claw arrangement of the instant invention, taken from the inside of a camera looking outwardly toward the apertured wall.
Figure 2:
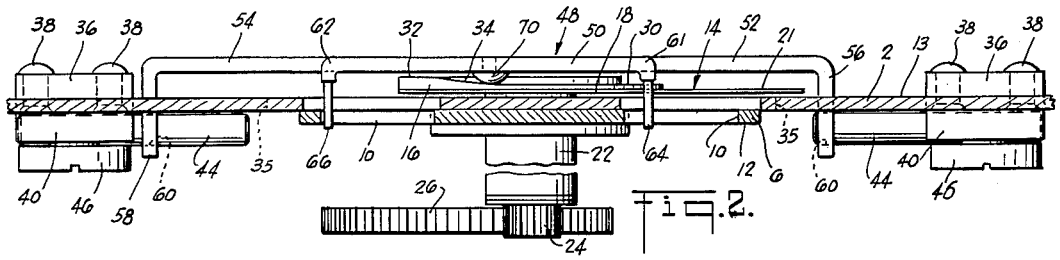
Fig. 2 is a cross sectional view taken along the line 2—2 of Fig. 1 but with the wall 4 shown in broken lines in Fig. 1 removed for purposes of clarity.
Figure 3:
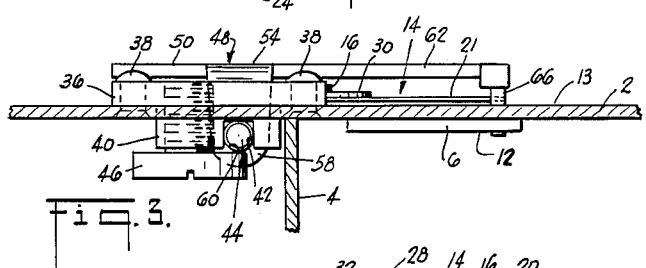
Fig. 3 is a cross sectional view taken along the line 3—3 of Fig. 1.
Figure 6:
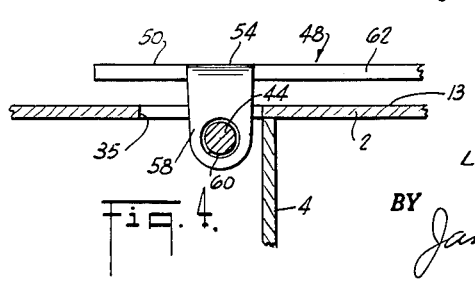
Figure 4:
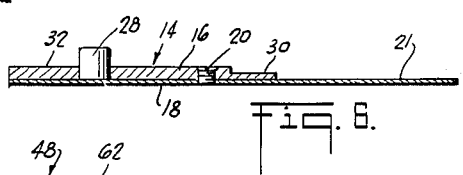
Fig. 4 is a cross sectional view taken along the line 4—4 of Fig. 1.

The wall 2, above the wall 4 as viewed in Fig. 1 and to the left of wall 4 as viewed in Fig. 3, is provided with a pair of apertures 35, one on each side of the shutter 14 and, as here specifically shown, substantially in line with one another and with the axis of rotation of the shutter 14. Supporting plates 36 extend across the remote ends of the apertures 35, being secured to the wall 2 by means of rivets 38 or other appropriate securing means, those plates 36 having projecting portions 40 extending down through the apertures 34 beyond the lower surface of the wall 2. Each of those projecting portions is provided with a recess 42 extending parallel to the slots 10 and substantially in line with the center of rotation of the shutter 34, mounting rods 44 being retained in the recess 42 by the enlarged heads 46 of screws threadedly received in the downwardly projecting portions of the plates 36 (see Fig. 3). The rods 44 each project from the recesses 42 toward the shaft 22 of the shutter 14, at least a substantial portion of the exposed lengths of the rods 44 being positioned beyond the outer periphery of the shutter plate 18 as it rotates, and hence beyond the area of movement of the shutter 14.

The claw frame, generally designated 48, comprises a central portion 50 from which arms 52 and 54 extend laterally toward and over the apertures 35, those arms having downwardly bent portions 56 and 58 respectively which extend through the apertures 35 and are provided with holes 60 through which the rods 44 loosely extend. The downwardly bent portions 56 and 58 are so spaced as to always be beyond the range of movement of the shutter 14, and the central portion 50 of the claw frame 48 is mounted above the shutter 14, that is to say, on the other side thereof from the wall 2.

The central claw frame portion 50 is provided with another pair of arms 61 and 62 extending toward and over the slots 10, to which arms the claws 64 and 66 are respectively connected, those claws extending downwardly from the arms 60 and 62 and into the slots 10. The claws 64 and 66 are also positioned beyond the area of movement of the shutter 14.

By virtue of the manner in which the claw frame 48 is mounted on the rods 44, being capable of sliding along the rods 44 in the direction of their length and also pivoting about the rods 44, and thus being pivotable about an axis substantially parallel to the slots 10, the claw frame 48 may be moved so as to cause the claws 64 and 66 to move a film past the aperture 8 in conventional manner.

Appropriate motion is imparted to the claw frame 48 by means of the shutter 14. The central claw frame portion 50 is provided with an I-shaped slot 68 (see Fig. 1) through which the pin 28 on the shutter 14 projects. Hence as the shutter 14 rotates the claw frame 48 will be positively moved from side to side as viewed in Fig. 1 in timed relation to the rotation of the shutter 14. A cam follower 70 depends from the central claw frame portion 50 so as to be engaged by the cam track 30, 32, 34 on the shutter 14, the follower 70 being mounted on the claw frame 48 at a point displaced from the line between the mounting rods 44 so that the action between the cam follower 70 and the cam track 30, 32, 34 will cause the claw frame 48 to pivot about the mounting rods 44, engagement of the cam follower 70 with the raised portion 32 of the cam track causing the claw frame 48 to pivot so as to raise the claws 64 and 66 from the slots 10 and engagement of the cam follower 70 with the lower portion 30 of the cam track permitting the claw frame 48 to pivot so as to cause the claws 64 and 66 to project through the slots 10 and engage the sprocket holes in a film. The cam follower 70 is on the same side of the pivotal axis of the claw frame 48 as are the arms 61 and 62, the latter counterbalancing the frame 48 so as to cause engagement between the cam follower and the cam.

The cycle of operation may best be understood by assuming that the film is to be moved from right to left and the shutter 14 to be rotated in a counter-clockwise direction as viewed in Fig. 1, Figs. 1 and 2 showing that shutter in a position just prior to the uncovering of the aperture 8 so as to expose a frame of the film. As the shutter 14 rotates in a counter-clockwise direction from its position shown in Figs. 1 and 2 the cam follower 70 rides up along the inclined cam path 34 and onto the raised portion 32 thereof, the claw frame 48 thus pivoting in a clockwise direction as viewed from the right hand side of Fig. 1 and lifting the claws 64 and 66 from the position shown in Fig. 2, disengaging them from the sprocket holes on the film. As the shutter 14 continues to rotate the interaction between pin 28 and slot 68 will move the claw frame 48 to the right as viewed in Figs. 1 and 2, the claws 64 and 66 being retained in raised position and the film therefore remaining stationary while the aperture 8 is uncovered. Just after the outwardly projecting arcuate portion 20 of the shutter plate 18 again covers the aperture 8, the cam follower 70 will ride down an inclined portion 34 of the cam track and onto the lower portion 30 thereof, the claws 64 and 66 thus being permitted to drop through the slots 10 at the right hand ends thereof and engaging new sprocket holes in the film. Thereafter, the pin and slot connection 28, 68 will slide the claw frame 48 to the left, the claws 64 and 66 pulling the film along with them so as to position the next film frame under the aperture 8.

By means of the arrangement and structure above described, the shutter 14 may be positioned very close to the aperture 8 and hence, if desired, very close to the focal plane of the optical system of the camera, while the film surface being exposed is also close to that focal plane, thus providing for accurate and effective photography. Claw mechanism is employed the operation of which does not interefere with the desired position and motion of the shutter. Indeed, the motion of the claw mechanism is accurately and positively imparted to it by the shutter itself. The structure in question is extremely inexpensive. The driving mechanism for both the shutter and the claw mechanism may be positioned in the camera remote from the shutter and claw assembly, thus making the invention particularly advantageous for use with motion picture cameras of the magazine type.

While but a single embodiment of the present invention has been here disclosed, it will be apparent that many changes may be made in the detailed design thereof without departing from the spirit of the invention as defined in the following claims.

I claim:

1. In a camera including a wall having an exposure aperture and a slot adjacent thereto, a shutter for alternately opening and closing said aperture, a claw passable through and movable within said slot for engaging and moving strip film past said aperture, and means for moving said shutter and said claw in a synchronized manner; the improvement which comprises said shutter comprising a central portion rotatably mounted within said camera adjacent said wall and to one side of said aperture and slot and an arcuate portion extending out therefrom so as to alternately cover and uncover said aperture as said shutter rotates, said slot being disposed beyond said arcuate portion, a claw frame positioned in said camera over said shutter on the other side thereof from said wall, a first member extending from said claw frame toward said slot and beyond the arcuate portion of said shutter, said claw being secured to said member and extending into said slot, second and third members extending in opposite directions from said claw frame in a direction substantially parallel to said slot and beyond the arcuate portion of said shutter, a pair of mounting elements secured to said camera, said second and third members being mounted on said elements so as to be movable laterally in the direction of said slot and pivotable about an axis parallel to the direction of lateral motion.

2. In a camera including a wall having an exposure aperture and a pair of slots adjacent thereto, a shutter for alternately opening and closing said aperture, claws passable through and movable within said slots for engaging and moving strip film past said aperture, and means for moving said shutter and said claw in a synchronized manner; the improvement which comprises said shutter comprising a central portion rotatably mounted within said camera adjacent said wall to one side of said aperture and slots and an arcuate portion extending out therefrom so as to alternately cover and uncover said aperture as said shutter rotates, the axis of rotation of said shutter being substantially in line with said aperture, said slots being disposed beyond said arcuate portion and one on either side of said aperture in the direction in which film is adapted to move, a claw frame positioned in said camera over said shutter and on the other side thereof from said wall, first and second members spaced from one another in the direction of movement of said film and extending laterally in the same direction from said claw frame toward said slots and beyond the arcuate portion of said shutter, said claws being secured to said members and extending into said slots, third and fourth members extending endwise in opposite directions from said claw frame in a direction substantially parallel to said slot and beyond the arcuate portion of said shutter, a pair of mounting elements secured to said camera and extending parallel to said slot, said second and third members being mounted on said elements so as to be slidable therealong and pivotable thereabout.

3. The camera of claim 1, in which said shutter is positioned directly next to said wall.

4. The camera of claim 2, in which said shutter is positioned directly next to said wall.

5. The camera of claim 2, in which said first and second members are symmetrically spaced with respect to the center of said claw frame and said third and fourth members are so positioned with respect to said claw frame that said first and second members tend to unbalance said claw frame as it is pivotally mounted by said third and fourth members on said mounting elements, thus causing said claw frame to tend to pivot about said mounting elements in a direction such that the claw-carrying side of said claw frame approaches said shutter, said shutter carrying a cam directed toward said claw frame and having raised and lowered portions, and said claw frame having a cam follower engageable with said cam and positioned on said claw frame between said first and second members and on the claw side of said third and fourth members, the engagement between said cam and cam follower causing said frame to pivot about an axis parallel to said mounting elements as said shutter rotates.

6. The camera of claim 5, in which said shutter is positioned directly next to said wall.

References Cited in the file of this patent

UNITED STATES PATENTS

| | | |
|---|---|---|
| 1,620,726 | Howell | Mar. 15, 1927 |
| 2,588,813 | Dube | Mar. 11, 1952 |